US008504261B2

(12) United States Patent
Phillips

(10) Patent No.: US 8,504,261 B2
(45) Date of Patent: Aug. 6, 2013

(54) POWERTRAIN CONTROL SYSTEMS AND METHODS WITH PARAMETER TRANSFER BETWEEN AN ECM AND A TCM FOR ECM AND TCM BASED CONTROL

(75) Inventor: Andrew W. Phillips, Rochester, MI (US)

(73) Assignee: GM Global Technology Operations LLC

( * ) Notice: Subject to any disclaimer, the term of this patent is extended or adjusted under 35 U.S.C. 154(b) by 473 days.

(21) Appl. No.: 12/725,834

(22) Filed: Mar. 17, 2010

(65) Prior Publication Data
US 2011/0231071 A1    Sep. 22, 2011

(51) Int. Cl.
| G06F 7/00 | (2006.01) |
| G06F 17/00 | (2006.01) |
| G06F 19/00 | (2011.01) |
| B60T 8/24 | (2006.01) |
| G05D 1/00 | (2006.01) |
| G06G 7/70 | (2006.01) |

(52) U.S. Cl.
USPC ............... 701/51; 701/53; 701/54; 701/58; 701/60; 701/90; 701/101; 701/110

(58) Field of Classification Search
USPC ........................... 701/54, 51, 53, 58
See application file for complete search history.

(56) References Cited

U.S. PATENT DOCUMENTS

| 4,957,194 | A |   | 9/1990 | Sawa et al. |
| 5,121,821 | A |   | 6/1992 | Poorman et al. |
| 5,364,321 | A | * | 11/1994 | Togai et al. ................ 477/42 |
| 5,606,119 | A | * | 2/1997 | Wallerand et al. ......... 73/114.11 |
| 5,804,711 | A | * | 9/1998 | Remboski et al. ......... 73/114.05 |
| 6,035,252 | A | * | 3/2000 | Dixon et al. ................ 701/102 |
| 6,132,336 | A |   | 10/2000 | Adachi et al. |
| 6,269,293 | B1 | * | 7/2001 | Correa et al. .................. 701/51 |
| 6,820,589 | B2 | * | 11/2004 | Okubo et al. ............. 123/339.19 |
| 7,513,851 | B2 |   | 4/2009 | Sieffert et al. |

FOREIGN PATENT DOCUMENTS

WO   WO 2009/083776   *  7/2009

* cited by examiner

*Primary Examiner* — Asfand Sheikh
*Assistant Examiner* — Allen Chein

(57) ABSTRACT

A control system includes an engine control module and a transmission control module. The transmission control module communicates with the engine control module via a network. The transmission control module generates at least one of a back torque signal and a first engine acceleration signal. The transmission control module transmits the at least one of the back torque signal and the first engine acceleration signal to the engine control module via the network. The engine control module controls operation of an engine based on the at least one of the back torque signal and the first engine acceleration signal.

11 Claims, 4 Drawing Sheets

POWERTRAIN CONTROL SYSTEMS AND METHODS WITH PARAMETER TRANSFER BETWEEN AN ECM AND A TCM FOR ECM AND TCM BASED CONTROL

FIELD

The present disclosure relates to engine and transmission control systems that include an engine control module and a transmission control module.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various engine control algorithms rely on timely estimation of engine speed. The engine control algorithms include direct algorithms, indirect algorithms, and/or diagnostic algorithms. Direct algorithms include determining parameters, such as spark timing, fuel injection volumes, and throttle position. As an example, an indirect algorithm may estimate a parameter, such as engine output torque. Diagnostic algorithms may include, for example, detecting a misfire, detecting operation of a faulty intake or exhaust valve assembly, etc.

An engine control module can obtain estimates of engine speed based on interrupt monitoring of engine speed sensors, such as crankshaft speed sensors. Multiple engine speed sensors are used to accurately detect the position and speed of the crankshaft. The engine control module may condition the signals from the engine speed sensors (e.g., smoothing and filtering) to account for manufacturing variations and noise. Manufacturing variations include variations in distances between engine speed sensors. An engine control system may have, for example, as many as 60 engine speed sensors spaced about a circumference of a monitored gear or toothed wheel. Position and speed of the gear or toothed wheel is directly related to position and speed of, for example, a crankshaft of an engine. This signal conditioning can introduce delay in engine speed determinations.

The position and speed of the crankshaft is affected by back torque exerted on the engine by a transmission. The back torque on the engine can add noise to generated engine speed signals. As a result, additional noise is contained in parameters determined and/or signals generated based on the engine speed signals.

SUMMARY

A control system is provided that includes an engine control module and a transmission control module. The transmission control module communicates with the engine control module via a network. The transmission control module generates at least one of a back torque signal and a first engine acceleration signal. The transmission control module transmits the at least one of the back torque signal and the first engine acceleration signal to the engine control module via the network. The engine control module controls operation of an engine based on the at least one of the back torque signal and the first engine acceleration signal.

In other features, an engine control module is provided and includes a transceiver that receives at least one of a back torque signal and a first engine acceleration signal from a transmission control module via a network. A propulsion torque module determines propulsion torque of the engine based on the at least one of the back torque signal and the first engine acceleration signal.

In yet other features, a transmission control module is provided and includes a transceiver and at least one of a back torque module and an engine acceleration module. The transceiver receives an engine speed signal from an engine control module via a network. The back torque module generates a back torque signal based on the engine speed signal. The engine acceleration module generates an engine acceleration signal. The transceiver transmits at least one of the back torque signal and the engine acceleration signal to the engine control module.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
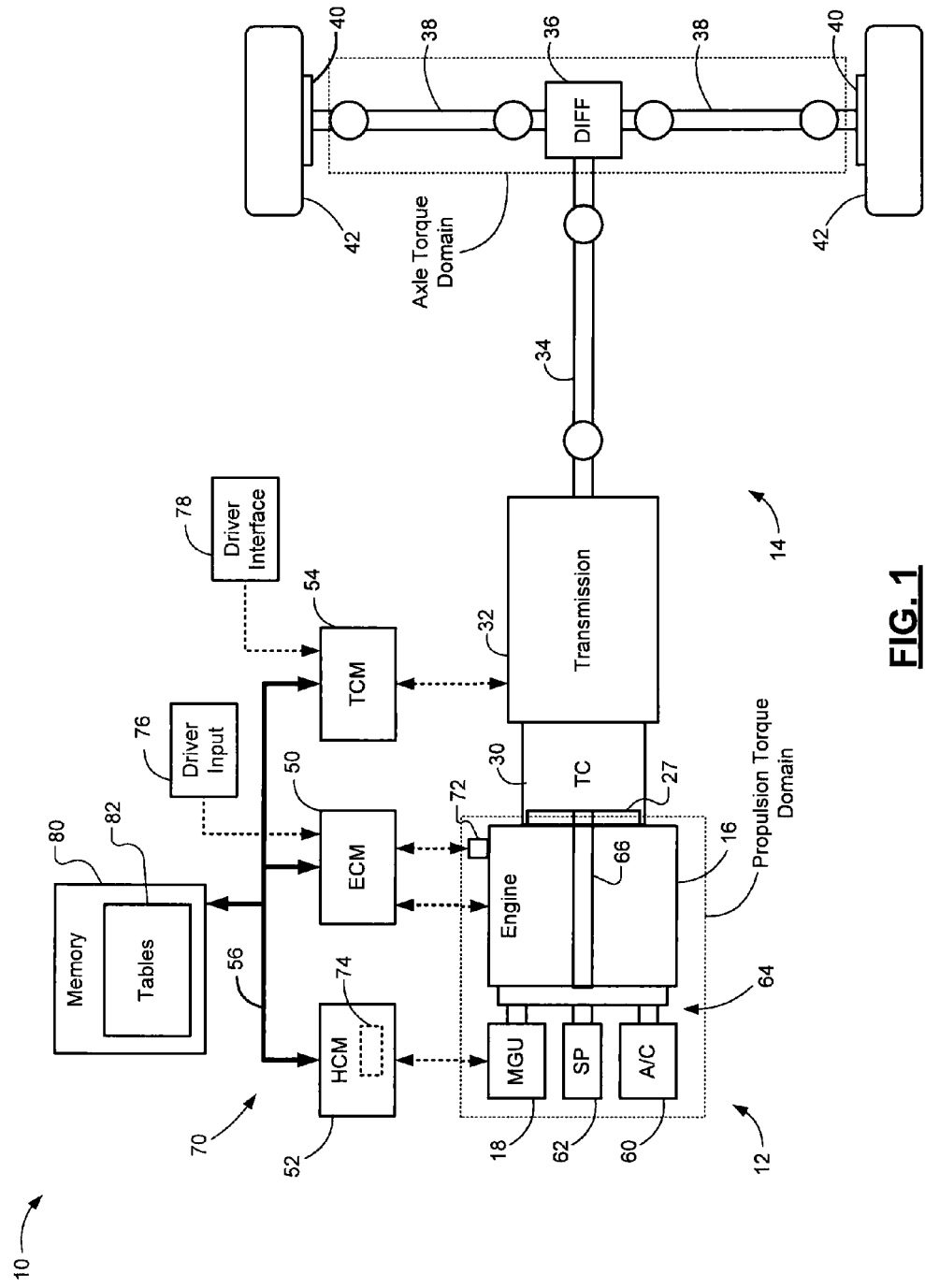
FIG. 1 is a functional block diagram of a hybrid powertrain system incorporating engine and transmission control in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four strokes are repeated during operation of the engine.

In addition, although the following embodiments are described primarily with respect to example internal combustion engines, the embodiments of the present disclosure may apply to other internal combustion engines. For example, the present invention may apply to compression ignition, spark ignition, homogeneous spark ignition, homogeneous charge compression ignition, stratified spark ignition, diesel, and spark assisted compression ignition engines.

Various engine control algorithms rely on timely estimation of engine speed, acceleration, and torque. This includes direct and indirect control variables and diagnostic algorithms. Examples of direct variables are spark timing and fuel injection volumes (fuel quantities). An example of an indirect variable may be engine output torque, as engine output torque is determined based on other parameters, such as spark timing and fuel quantities. An example of a diagnostic algorithm is a misfire detection algorithm. A misfire may refer to when fuel in a cylinder does not ignite during a spark firing event.

While an engine control module is able to obtain parameter estimates based on, for example, spatial interrupts of engine speed sensors, signals from the engine speed sensors can require smoothing and filtering due to manufacturing variations and noise. This delays reception of the engine speed signals. Also, dynamics in back torque on an engine can introduce additional noise on the engine speed signals and affect calculations performed based on the engine speed signals. Furthermore, differentiating between high-spatial-frequency engine speed measurements or determining a derivative of an engine speed signal can also introduce additional noise.

In the following described embodiments, engine speed, engine acceleration and/or back torque on an engine are monitored and directly and/or indirectly determined by a transmission control module (TCM) and fed back to an engine control module (ECM). This allows an engine control module to monitor and determine causes of engine speed fluctuations. The fluctuations may be based on a firing event of each cylinder of an engine or averaged over multiple firing events (e.g., a full combustion cycle—2 rotations of a crankshaft).

In FIG. 1, an exemplary hybrid powertrain system 10 is shown. Although the powertrain system 10 is illustrated as a hybrid and rear wheel drive (RWD) powertrain, it is appreciated that the embodiments of the present disclosure can be implemented with any other hybrid and non-hybrid powertrain configurations.

The powertrain system 10 includes a propulsion system 12 and a drivetrain system 14. The propulsion system 12 includes an internal combustion engine (ICE) 16 and an electric motor (EM) or a motor generator unit (MGU) 18. The drive train system 14 includes a flexplate or flywheel 27, a torque converter or other coupling device 30, a transmission 32, a driveshaft 34, a differential 36, axle shafts 38, brakes 40 and driven wheels 42. The propulsion system 12 has an ECM 50 and may have a hybrid control module (HCM) 52. The drivetrain system 14 has a TCM 54.

The control modules 50, 52, 54 share information with each other over a network 56, such as a car area network (CAN). As an example, the ECM 50 may determine an average or mean engine speed $S_{Emean}$. The TCM 54 receives the mean engine speed $S_{Emean}$ and may determine back torque $T_{PROPTCM}$. The back torque $T_{PROPTCM}$ is equal to the torque applied on the crankshaft 66 by the torque converter 30. The back torque $T_{PROPTCM}$ may be equal in magnitude to the output torque of the engine 16. The back torque $T_{PROPTCM}$ may be based on the mean engine speed $S_{Emean}$ determined by the ECM 50 or may be determined based solely on parameters determined by the TCM 54. Other information may be shared between the control modules 50, 52, 54, as described in further detail below.

The ECM 50 may be able to determine certain parameters directly and without estimation that the TCM 54 may otherwise need to estimate, and vice versa. Also, the ECM 50 and the TCM 54 may be able to collect information for certain parameters at a higher rate than can be transmitted over the network 56. In other words, the frequency at which the ECM 50 and the TCM 54 collect data may be higher than the frequency at which the same data can be transferred over the network 56. The bandwidth available for transfer of information between the ECM 50 and the TCM 54 may be limited. For example, the ECM 50 may be able to collect data from multiple engine speed sensors at a first rate, but may transfer a single engine speed signal at a second rate over to the TCM 54. The second rate may be less than the first rate. The sharing of information allows the ECM 50 and TCM 54 to utilize information, otherwise estimated or unavailable in performing engine and transmission control tasks. Other sharing examples are described below.

The propulsion system 12 may also include auxiliary components, such as an A/C compressor 60 and a steering pump 62. The MGU 18 and the auxiliary components may be coupled to the ICE 16 using a belt and pulley system 64. The belt and pulley system 64 may be coupled to a crankshaft 66 of the ICE 16 and enable torque to be transferred between the crankshaft 66 and the MGU 18 and/or the auxiliary components. This configuration is referred to as a belt alternator starter (BAS) system. The crankshaft 66 drives the drivetrain system 14.

In operation, output torque from the MGU 18 may be applied to the crankshaft 66. Propulsion torque of the crankshaft 66 is transferred through the drivetrain system components to provide an axle torque $T_{AXLE}$ at the axle shafts 38 to drive the wheels 42. The axle torque $T_{AXLE}$ may be referred to as the powertrain output torque. More specifically, the propulsion torque is multiplied by several gear ratios provided by the coupling device 30, the transmission 32 and the differential 36 to provide the axle torque $T_{AXLE}$. Essentially, the propulsion torque is multiplied by an effective gear ratio, which is a function of a ratio introduced by the coupling device 30, a transmission gear ratio determined by transmission input/output shaft speeds, a differential ratio, as well as any other component that may introduce a ratio in the drivetrain system 14 (e.g., a transfer case in a four wheel drive (4WD) or all wheel drive (AWD) powertrain). For the purposes of torque control, the axle torque domain includes the ICE 16 and the MGU 18.

The powertrain 10 also includes a control system 70, which may regulate torque output of the engine 16 and the MGU 18. The control system 70 includes the control modules 50, 52, 54. The control system 70 may regulate the torque output of the MGU 18 based on speed of the MGU 18, which may be detected by, for example, one or more engine speed sensors 72. The engine speed sensors may detect position and/or speed of an object, such as position and/or speed of a crankshaft and/or camshaft. The information from the engine speed sensors 72 may be provided directly to the control modules 50, 52, 54.

The ECM 50, the HCM 52 and/or the TCM 54 control powertrain output torque. The HCM 52 can include one or more sub-modules including, but not limited to, a BAS control processor (BCP) 74. A driver input 76 communicates with the ECM 50. The driver input 76 can include, but is not limited to, an accelerator pedal and/or a cruise control system input. A driver interface 78 communicates with the TCM 54. The driver interface 78 includes, but is not limited to, a transmission range selector (e.g., a PRNDL lever). The control modules 50, 52, 54 may communicate with memory 80, which includes tables 82. Information that is generated by each of the modules 50, 52, 54 may be directly transmitted between the modules 50, 52, 54 or stored in the memory 80 for access by each of the modules.

Figure 2:
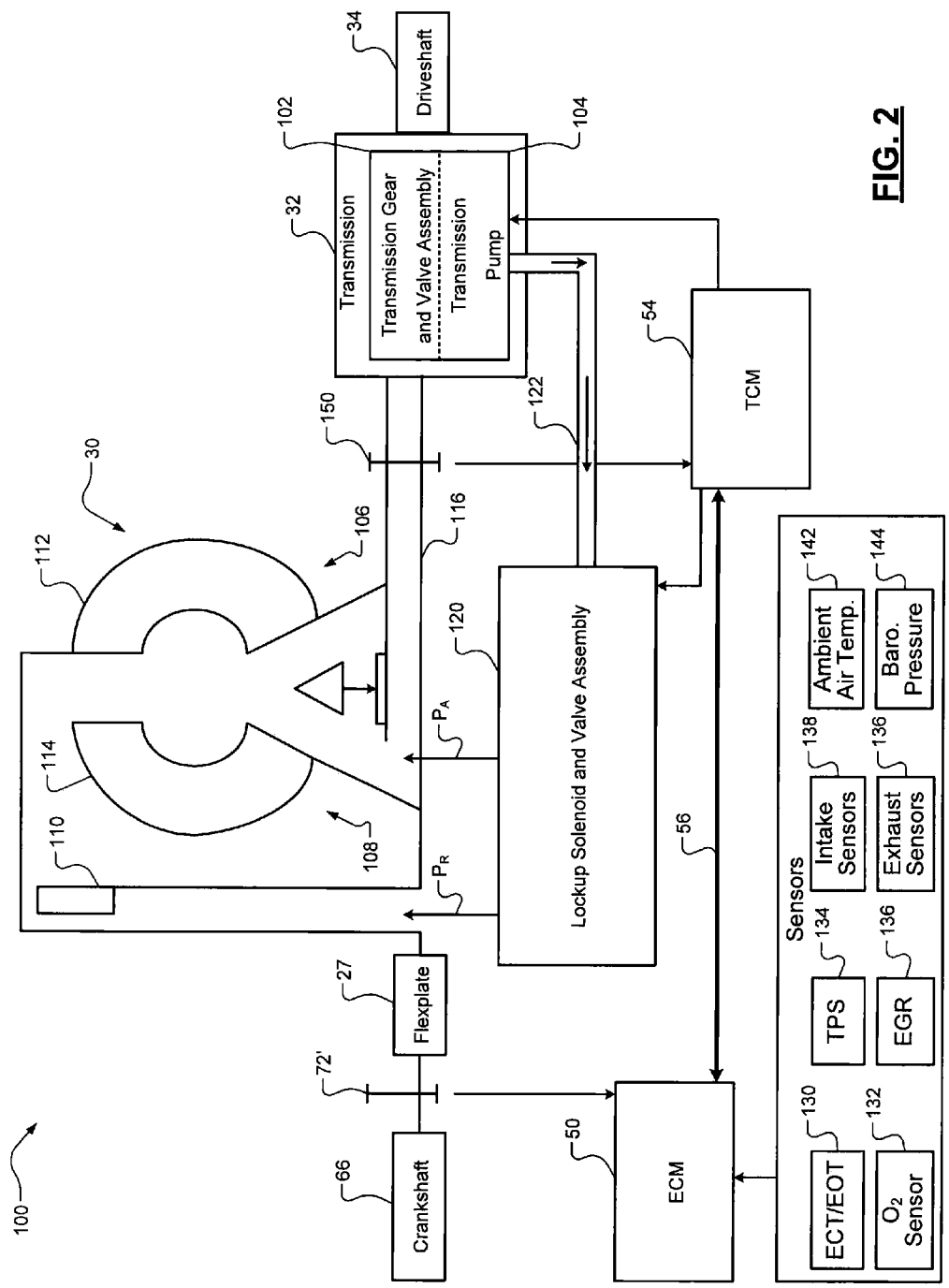
FIG. 2 is a functional block and schematic diagram of a portion of the hybrid powertrain system of FIG. 1.

Referring now also to FIG. 2, a functional block and schematic diagram of a portion 100 of the hybrid powertrain system 10 is shown. Portions of the propulsion, drivetrain and control systems 12, 14, 70 are shown including the torque converter 30, the transmission 32, the ECM 50, the TCM 54 and the crankshaft 66. The transmission 32 includes a transmission gear and valve assembly 102 and a transmission pump 104.

The torque converter 30 includes an engine side 106, a transmission side 108, and an electronically controlled capacity clutch (ECCC) 110. The engine side 106 includes an impeller housing 112 (i.e. torque converter pump) that is connected to the flexplate 27, which in turn is connected to the crankshaft 66. The impeller housing 112 may be connected to the transmission pump 104. The transmission side 108 includes a turbine 114 that is connected to a transmission input shaft 116. The transmission input shaft 116 is connected to the transmission gear and valve assembly 102, which transfers torque to the driveshaft 34.

The propulsion torque from the crankshaft 66 is provided to the flex plate 27 and in turn to the impeller housing 112. As the impeller housing 112 is rotated, torque is transferred to the turbine 114, which creates pump torque $T_P$ in the transmission pump 104. The transmission pump 104 pumps transmission fluid to the transmission gear and valve assembly 102 and to a lockup solenoid and valve assembly 120 via a transmission fluid path or line 122. Although, the transmission fluid line 122 is shown as being connected between the transmission pump 104 and the lockup solenoid and valve assembly 120, the transmission fluid line 122 also supplies fluid to the transmission gear and valve assembly 102.

The TCM 54 controls pressure in the transmission fluid line 122 by controlling apply and release fluid pressures $P_A$ and $P_R$ in the torque converter 30, which in turn controls torque converter slip torque $T_{slip}$ between the impeller housing 112 and the turbine 114. The TCM 54 adjusts and maintains the torque converter slip torque $T_{slip}$ by controlling pressure on the ECCC 110. The TCM 54 controls pressure on the ECCC 110 by adjusting the fluid pressures $P_A$ and $P_R$ via the lockup solenoid and valve assembly 120.

The TCM 54 communicates with the ECM 50 via the network 56. The ECM 50 receives engine speed signals from one or more engine speed sensors, such as from an engine speed sensor 72'. The ECM 50 receives signals from other sensors, such as from an engine coolant temperature (ECT) and engine oil temperature (EOT) sensors 130, an oxygen sensor 132, a throttle position sensor 134, an exhaust gas recirculation (EGR) sensor 136, intake sensors 138, exhaust sensors 140, an ambient air temperature sensor 142, and a barometric pressure sensor 144. The intake sensors 138 may include a mass air flow (MAF) sensor, an intake air temperature (IAT) sensor, and an intake manifold absolute pressure (MAP) sensor. The exhaust sensors 136 may include exhaust flow, temperature and pressure sensors.

The TCM 54 receives a turbine speed signal from a turbine speed sensor 150. The TCM 54 may also receive sensor signals from sensors and valves of the transmission and the lockup solenoid and valve assembly 120. For example, the TCM 54 may receive valve position signals, torque converter pressure signals, transmission fluid pressure signals, etc.

The ECM 50 and the TCM 54 share various information over the network 56. The ECM 50 may share, for example, engine speed information with the TCM 54. The TCM 54 may share, for example, propulsion torque (e.g., engine output torque), engine speed and engine acceleration information with the ECM 50.

The ECM 50 may determine engine position and/or speed based on: engine position and/or speed signals from the engine speed sensors 72'; back torque information from the TCM 54; engine speed information from the TCM 54; etc. The ECM 50 may determine derivatives of engine position and engine speed to obtain acceleration (and/or deceleration) of the engine 16. The position, speed (velocity) and acceleration information may be determined based on: the engine speed signals from the engine speed sensors; a propulsion torque signal, an engine speed signal and/or an acceleration signal from the TCM 54; etc.

The ECM 50 may further monitor deviation in, for example, an expected output torque of the engine 16 or deviation from a minimum spark for best torque (MBT). The monitoring may be based on the engine speed, engine acceleration, and propulsion torque signals from the TCM 54. Determining, monitoring and receiving of engine speeds, engine accelerations, and propulsion torques may be used to control operations, such as throttle position, spark and fuel timing, and fuel quantities of the engine 16.

The TCM 54 may determine derivatives of engine position and engine speed to obtain acceleration (and/or deceleration) of the engine 16. The position, speed (velocity) and acceleration information may be determined based on: an engine speed signal from the ECM 50; engine speed signals from engine speed sensors (e.g., the engine speed sensor 72'); the turbine speed signal; pressures within the torque converter 30; etc.

Figure 3:
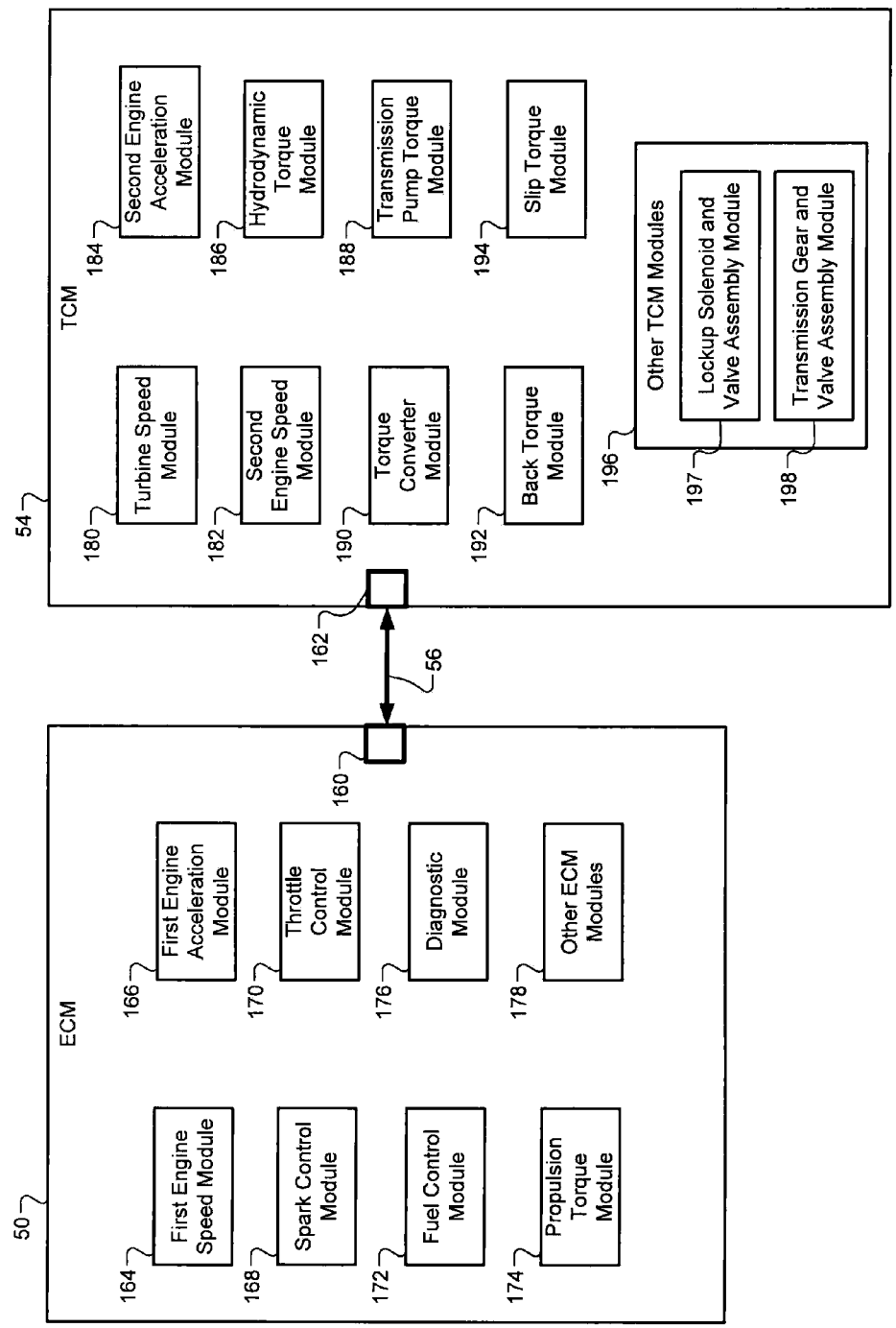
FIG. 3 is a functional block diagram of an engine control module and a transmission control module in accordance with an embodiment of the present disclosure.

Referring now also to FIG. 3, a functional block diagram of the ECM 50 and the TCM 54 is shown. The ECM 50 is distinct from and communicates with the TCM 54 over the network 56. The ECM 50 includes a first transceiver 160. The TCM 54 includes a second transceiver 162. In one embodiment, the first and second transceivers 160, 162 are connected to the network 56 via wired connections. In another embodiment, the first transceiver 160 wirelessly communicates with the second transceiver 162.

The ECM 50 includes a first engine speed module 164, an engine acceleration module 166, a spark control module 168, a throttle control module 170, a fuel control module 172, a propulsion torque module 174, a diagnostic control module 176, and may include other modules 178, such as a cruise control module, a cylinder deactivation module, etc. The modules 168, 170, 172, 174 may be referred to as parameter control modules. The first engine speed module 164 determines the mean engine speed of the engine 16 based on engine speed signals and/or other parameters described herein.

Figure 4:
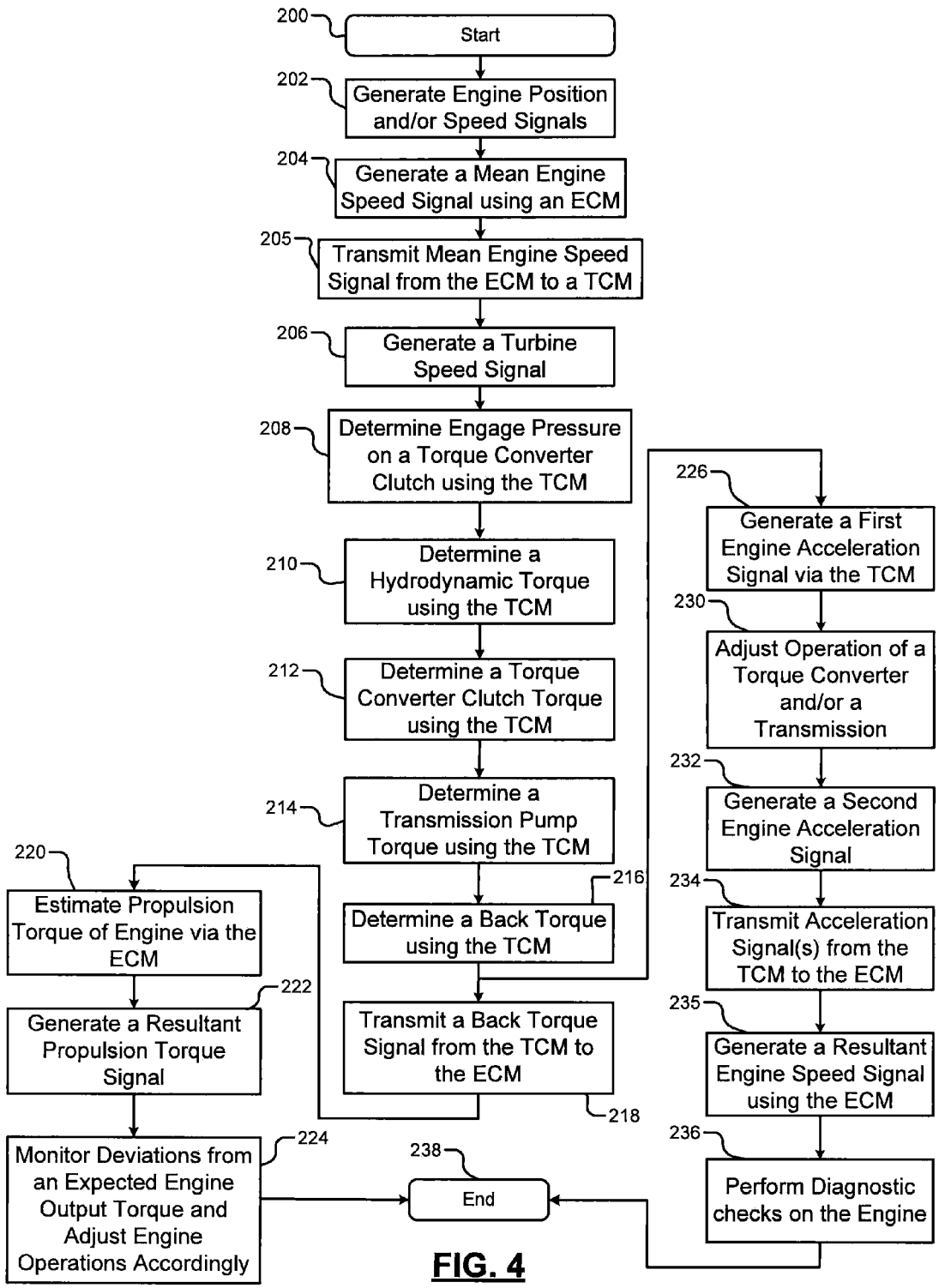
FIG. 4 is a flow diagram illustrating a method of operating a powertrain control system in accordance with an embodiment of the present disclosure.

The control modules 168, 170, 172, 174 control respectively spark timing, throttle position, fuel timing and fuel quantities, and propulsion torque or output torque of the engine 16 based on parameters described with respect to the embodiments of FIGS. 1, 2 and 4. Example parameters are engine speed, coolant and oil temperatures, barometric pressures, etc. The diagnostic control module 176 controls diagnostic monitoring and testing of the engine 16, such as detection of misfires, based on parameters described with respect to the embodiments of FIGS. 1, 2 and 4.

The TCM 54 includes a turbine speed module 180, a second engine speed module 182, an engine acceleration module 184, a hydrodynamic torque module 186, a transmission pump torque module 188, a torque converter module 190, a back torque module 192, a slip torque module 194, and may include other modules 196. The other modules 196 may include a lockup solenoid and valve assembly module 197 and a transmission gear and valve assembly module 198. The turbine speed module 180 determines the speed of the turbine 114 based on the turbine speed signals $S_T$ and/or other parameters described herein. The modules 186, 188, 190, 192 determine respectively hydrodynamic torques $T_{HYDINPUT}$, $T_{HYDOUTPUT}$ of the torque converter 30, transmission pump torque $T_P$ of the transmission 32, torque converter clutch torque $T_{CT}$, and back torque $T_{PROPTCM}$ on the engine 16, as described with respect to the embodiments of FIGS. 1, 2 and 4.

The slip torque module 194 determines apply, release and/or engage pressures $P_A$, $P_R$, $P_{TCC}$ of the torque converter clutch. The slip torque module 194 may determine, set and/or adjust a predetermined slip torque $T_{slip}$ by adjusting the pressures $P_A$, $P_R$, $P_{TCC}$ based on, for example, the mean engine speed information.

The lockup solenoid and valve assembly module 197 controls the lockup solenoid and valve assembly 120, for example, to maintain the predetermined clutch slip torque $T_{slip}$ and/or to adjust the pressure in the transmission fluid line 122. The transmission gear and valve assembly module 198 may control the transmission gear and valve assembly 102 to adjust pressure in the transmission fluid line 122.

Referring now also to FIG. 4, a flow diagram illustrating a method of operating a powertrain control system is shown. Although the following tasks performed at 202-236 are described primarily with respect to the embodiments of FIGS. 1-3, the tasks performed at 202-220 may be applied to other embodiments of the present disclosure.

The method may begin at 200. At 202, engine speed sensors, such as the sensors 72, 72', generate engine position and/or speed signals. At 204, the ECM 50 and/or the first engine speed module 164 generates a mean engine speed signal $S_{Emean}$ based on the engine position and/or speed signals. The mean engine speed signal $S_{Emean}$ may be an average engine speed over a predetermined period and generated based on spark timing, fuel quantities, misfire detection, etc. and transmitted to the TCM 54. The predetermined period may be equal to period of a combustion cycle of a cylinder or a full combustion cycle of the engine 16. At 205, the mean engine speed signal $S_{Emean}$ may be transmitted from the ECM 50 to the TCM 54 via the network 56.

At 206, the turbine speed sensor 150 generates a turbine speed signal $S_T$. At 208, the TCM 54 and/or the slip torque module 194 determines an engage pressure $P_{TCC}$ on the ECCC 110. The engage pressure $P_{TCC}$ may be a commanded apply pressure and/or based on the fluid pressures $P_A$ and $P_R$ and/or the fluid pressure $P_{line}$ in the transmission fluid line 122. The fluid pressures $P_A$ and $P_R$ may be a function of, for example, a commanded torque slip, a predetermined torque slip, and/or a mean engine speed. As an example, the engage pressure $P_{TCC}$ may be equal to a difference between the fluid pressures $P_A$ and $P_R$. The line pressure $P_{line}$ may be a commanded line pressure, an estimated line pressure, and/or directly measured via a line pressure sensor. The line pressure $P_{line}$ may be determined based on the mean engine speed $S_{Emean}$, the turbine speed $S_T$, the pressures $P_A$ and $P_R$, etc.

At 210, the TCM 54 and/or the hydrodynamic torque module 186 determines input hydrodynamic torque $T_{HYDINPUT}$ and may determine output hydrodynamic torque $T_{HYDOUTPUT}$. The input and output hydrodynamic torques $T_{HYDINPUT}$, $T_{HYDOUTPUT}$ may be determined, for example, using equations 1-6. The torque ratio (TR) is a function of the speed ratio (SR), as shown by equation 2. The $C_{factor}$ and the $K_{factor}$ are based on the speed ratio, as shown by equation 3. The $C_{factor}$ when plotted versus the speed ratio SR is generally constant for values of the speed ratio SR near 0. The $C_{factor}$ decreases at an increasing rate as the speed ratio increases from 0 to 1.

$$SR = \frac{S_T}{S_{Emean}} \tag{1}$$

$$TR = F\{SR\} \tag{2}$$

$$C_{factor} = \frac{1}{K_{factor}^2} = F\{SR\} \tag{3}$$

$$T_{PROP} = C_{factor} \times S_{Emean}^2 \tag{4}$$

$$T_{HYDINPUT} = \left(\frac{S_{Emean}}{K_{factor}}\right)^2 \tag{5}$$

$$T_{HYDOUTPUT} = TR \times C_{factor} \times S_{Emean}^2 \tag{6}$$

At 212, the TCM 54 and/or the torque converter module 190 determines a torque converter clutch torque $T_{CT}$. The torque converter clutch torque $T_{CT}$ may be determined using equation 7. $G_{TCC}$ is a torque converter clutch gain.

$$T_{CT} = F\{P_{TCC}, G_{TCC}\} \tag{7}$$

At 214, the TCM 54 and/or the transmission pump torque module 188 determines the transmission pump torque $T_P$. The transmission pump torque $T_P$ may be determined using equation 8.

$$T_P = F\{S_{Emean}, P_{line}\} \tag{8}$$

After 214, the TCM may proceed to 216 and/or 226.

At 216, the TCM 54 and/or back torque module 192 determines input torque to, for example, the torque converter 30. The input torque is equal to the back torque $T_{PROPTCM}$ applied on the crankshaft 66 by the torque converter 30. The back torque $T_{PROPTCM}$ may be determined using equations 9 or 10. The back torque $T_{PROPTCM}$ may be an average or mean torque and may be equal to a sum of the torques acting on the crankshaft 66 and downstream from the engine 16, such as a sum of the input hydrodynamic torque $T_{HYDINPUT}$, the torque converter clutch torque $T_{CT}$, and the transmission pump torque $T_P$. The back torque $T_{PROPTCM}$ may be used by an estimator of the TCM 54 and/or the ECM 50 for real-time (i.e., actual time at which an event occurs with negligible delay) determination of engine speed, engine acceleration and combustion torques.

$$T_{PROPTCM} = F\{T_{HYDINPUT}, T_{TC}, T_P\} \tag{9}$$

$$T_{PROPTCM} = T_{HYDINPUT} + T_{CT} + T_P \tag{10}$$

At 218, the ECM 50 receives the back torque $T_{PROPTCM}$ as a back torque signal, which may be transmitted from the TCM 54. At 220, the ECM 50 may estimate the propulsion torque $T_{PROPECM}$ based on commanded and/or actual throttle positions, spark timing, fuel quantities, and/or misfire detection using the tables 82 of the memory 80. The tables 82 may relate the propulsion torque $T_{PROPECM}$ to the commanded and/or actual throttle positions, spark timing, and fuel quantities.

At 222, the ECM 50 may include a comparison module that compares the back torque $T_{PROPTCM}$ from the TCM 54 with the estimated propulsion torque $T_{PROPECM}$ of the ECM 50 to generate a resulting propulsion torque $T_{PROPRES}$. The resulting propulsion torque $T_{PROPRES}$ may be a mean torque and a function of the torques $T_{PROPTCM}$, $T_{PROPECM}$.

The torques $T_{PROPTCM}$, $T_{PROPECM}$ may be generated with respect to a common torque point along the drivetrain of a vehicle, such as at a torque point between the crankshaft 66 and the flexplate 27. The torques $T_{PROPTCM}$, $T_{PROPECM}$ may be generated with respect to different points along a drivetrain and a difference between the torques $T_{PROPTCM}$, $T_{PROPECM}$ may be a function of component inertia and acceleration rate of that inertia. For example, the propulsion torque $T_{PROPECM}$ may be generated with respect to a first torque point between the crankshaft 66 and the flexplate 27. The back torque $T_{PROPTCM}$ may be generated in real-time and with respect to a second point between the impeller housing 112 and the turbine 114 or at a torque point external to the torque converter 30.

For this reason, before performing a comparison between the torques $T_{PROPECM}$, $T_{PROPTCM}$, one of the torques $T_{PROPECM}$, $T_{PROPTCM}$ may be adjusted to account for inertia of components between respective torque points. As an example, the back torque $T_{PROPTCM}$ may be originally generated by the TCM 54 accounting for inertia of certain components, such as the flex plate 27, the impeller housing 112, and/or the turbine 114. The inertia is directly related to the mass of the components.

The ECM 50 may control parameters, such as engine output torque, throttle position, spark timing, fuel quantities, etc., based on the back torque $T_{PROPTCM}$, the propulsion torque $T_{PROPTCM}$ and/or the resulting propulsion torque $T_{PROPRES}$. The parameters may be controlled by the spark control module 168, the throttle control module 170 and the fuel control module 172. The ECM 50 may adapt a steady-state engine torque model and/or model a crankshaft position (for improved fuel and spark timing) based on the propulsion torque $T_{PROPTCM}$, the propulsion torque $T_{PROPTCM}$ and/or the resulting propulsion torque $T_{PROPRES}$. The tasks at 220 and 222 may not be performed. The ECM 50 may control engine output torque, throttle position, spark timing, fuel quantities, etc. based on the propulsion torque $T_{PROPTCM}$ and not the propulsion torque $T_{PROPECM}$.

At 224, the ECM 50 may monitor deviations from an expected engine output torque $T_{PROPEXP}$, such as deviations from the MBT. The ECM 50 may compare the propulsion torque $T_{PROPTCM}$ and/or the resulting propulsion torque $T_{PROPRES}$ with the expected engine output torque $T_{PROPEXP}$. Difference between the expected engine output torque $T_{PROPEXP}$ and one of the back torque $T_{PROPTCM}$ and the resulting propulsion torque $T_{PROPRES}$ may be unexpected torque $T_U$.

The ECM 50 may control the engine output torque, throttle position, spark timing, fuel quantities, etc. based on the expected engine output torque $T_{PROPEXP}$ and/or the unexpected torque $T_U$. The ECM 50 may adapt a steady-state engine torque model and/or a model of crankshaft position (for improved fuel and spark timing) based on the expected engine output torque $T_{PROPEXP}$ and/or the unexpected torque $T_U$.

At 226, the TCM 54 may receive, determine and/or monitor speed and acceleration of the engine 16. The engine speed and/or acceleration may be determined based on the input hydrodynamic torque $T_{HYDINPUT}$, the torque converter clutch torque $T_{CT}$ and the transmission pump torque $T_P$. The torques $T_{HYDINPUT}$, $T_{CT}$, $T_P$ may be commanded, estimated and/or measured torque valves and are less susceptible to measurement noise than differentiated engine speed signals. The TCM 54 may determine acceleration (and/or deceleration) of the engine 16 in real-time and generate a first acceleration signal. The first acceleration signal may be generated based on or as a function of the propulsion torque $T_{PROPTCM}$, the line pressure $P_{line}$, the mean engine speed $S_{Emean}$ (as determined by the ECM 50 and/or the TCM 54), turbine speed $S_T$, etc.

At 230, TCM 54 may adjust operation of the torque converter 30 and/or the transmission 32, such as by adjusting the slip torque $T_{slip}$, the engage pressure $P_{TCC}$, and/or the line pressure $P_{line}$. At 232, the TCM 54, anticipating the adjustment in the slip torque $T_{slip}$, the engage pressure $P_{TCC}$, and/or the line pressure $P_{line}$, may adjust the first acceleration signal based on the adjusted slip torque $T_{slip}$, engage pressure $P_{TCC}$, and/or line pressure $P_{line}$ to generate a second acceleration signal. The second acceleration signal may be used by an estimator of the TCM 54 and/or of the ECM 50 for real-time (i.e., actual time at which an event occurs with negligible delay) determination of engine acceleration and combustion torques. Tasks at 232 may be performed while tasks at 230 are performed.

At 234, the TCM 54 may transmit an engine speed signal (e.g. mean engine speed signal), the first acceleration signal, and/or the second acceleration signal to the ECM 50. At 235, the engine speed signal from the TCM 54 may be compared with the engine speed signal generated by the ECM 50 to generate a resultant or mean engine speed signal. The engine speed signal from the TCM 54 may be generated, for example, by integrating the first and/or second acceleration signals.

The first and second acceleration signals may be compared with acceleration signals generated by the ECM 50. The ECM 50 may generate a resultant acceleration signal based on the received acceleration signals, the comparison between the acceleration signals, the position or speed signals from the engine speed sensors, spark timing, fuel injection quantities, misfire detection, etc.

The ECM 50 may control the engine output torque, throttle position, spark timing, fuel quantities, etc. based on the resultant engine speed signal, the first acceleration signal, the second acceleration signal, and/or the resultant acceleration signal. The ECM 50 may adapt the steady-state engine torque model and/or the model of crankshaft position based on the resultant engine speed signal, the first acceleration signal, the second acceleration signal, and/or the resultant acceleration signal. This allows engine speed related observer algorithms within engine code of the ECM 50 to be provided with accurate information of an observed plant (e.g., engine speed and engine acceleration).

At 236, the ECM 50 and/or diagnostic module may perform diagnostic checks on the engine and detect characteristics, such as engine misfires, faulty valve assemblies, and/or weak and strong cylinders. The detection may be based on the first and/or the second acceleration signals, the spark timing, the position of the crankshaft and/or camshafts of the engine 16, etc. A weak cylinder is a cylinder that generates less torque than a predetermined torque level. A strong cylinder is a cylinder that generates more torque than the predetermined torque level. The ECM may adjust operation of the engine based on the determined characteristics. The adjustment in engine operation may include adjusting spark and fuel timing, fuel quantities, and/or throttle position.

As the misfire detection is based on information from the TCM 54, a faulty detection of a misfire may be prevented. For example, a TCM may command a change in transmission line pressure, which can in turn alter acceleration of an engine. Due to this change in acceleration, an ECM may falsely detect a misfire based on the change in engine acceleration. Since the TCM adjusts the first acceleration signal based on changes in line pressure, the adjustments in line pressure are accounted for in the second acceleration signal.

Also, an unexpected difference in acceleration values determined by the TCM 54 and the ECM 50 may indicate that, for example, a detected misfire is a false detection. The change in acceleration may be due to a change on the transmission side of the torque converter and not due to an event on the engine side of the torque converter. After 224 and/or 236 control may return to 202 or end at 238, as shown.

The above-described tasks 202-236 are meant to be illustrative examples; the tasks 202-236 may be performed sequentially, synchronously, simultaneously, continuously, during overlapping time periods or in a different order depending upon the application.

The real-time aspects of the above described embodiments allows for improved engine and transmission performance, improved fuel economy, and improved diagnostic checks. Real-time information of back torque and other parameters are provided to estimators (e.g., respective modules of an ECM) of engine speed, acceleration and combustion torque for improved engine performance. Dynamics of an engine are determined with reduced noise, as the dynamics are determined on a transmission side of a torque converter, as opposed to on an engine side.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
an engine control module; and
a transmission control module that communicates with the engine control module via a network, generates a back torque signal and a first engine acceleration signal, and transmits the back torque signal and the first engine acceleration signal to the engine control module via the network,
wherein the transmission control module comprises
a hydrodynamic torque module that determines a hydrodynamic torque of a torque converter,
a torque converter module that determines a torque converter clutch torque of the torque converter,
a pump torque module that determine a pump torque of a transmission, and
a back torque module that generates the back torque signal based on the hydrodynamic torque, the torque converter clutch torque, and the pump torque, and
wherein the engine control module controls operation of an engine based on the back torque signal and the first engine acceleration signal.

2. The control system of claim 1, wherein the engine control module:
estimates an engine propulsion torque;
compares the back torque signal with the engine propulsion torque and generates a resultant propulsion torque signal; and
controls operation of the engine based on the resultant propulsion torque signal.

3. The control system of claim 1, wherein:
the engine control module transmits an engine speed signal via a first transceiver to the transmission control module;
the hydrodynamic torque module determines the hydrodynamic torque based on the engine speed signal; and
the pump torque module determines the pump torque based on the engine speed signal.

4. The control system of claim 1, wherein:
the hydrodynamic torque module determines the hydrodynamic torque based on an engine speed signal and a turbine speed signal;
the torque converter module determines the torque converter clutch torque based on an engage pressure of the torque converter and a torque converter clutch gain; and
the pump torque module determines the pump torque based on the engine speed signal and a transmission line pressure.

5. The control system of claim 1, wherein the transmission control module adjusts the first engine acceleration signal based on adjustment in at least one of a slip torque of the torque converter, an engage pressure of the torque converter, and a line pressure of the transmission.

6. The control system of claim 1, wherein the engine control module:
generates a second engine acceleration signal;
compares the first engine acceleration signal to the second engine acceleration signal to generate a resultant acceleration signal; and
controls the operation of the engine based on the resultant acceleration signal.

7. The control system of claim 1, further comprising an engine speed module that determines a speed of the engine and generates an engine speed signal, wherein the engine control module:
transmits the engine speed signal to the transmission control module; and
receives the back torque signal from the transmission control module based on the engine speed signal.

8. The control system of claim 1, wherein the engine control module comprises:
an engine acceleration module that generates a second engine acceleration signal and compares the first engine acceleration signal to the second engine acceleration signal to generate a resultant engine acceleration signal; and
a parameter control module that controls at least one of spark timing, fuel timing, fuel quantities, and throttle position based on the resultant engine acceleration signal.

9. The control system of claim 1, further comprising a diagnostic module that, based on the first engine acceleration signal, detects engine characteristics including a misfire, a faulty valve assembly, a weak cylinder, and a strong cylinder,
wherein the weak cylinder is a cylinder that generates less torque than a predetermined torque level; and
wherein the strong cylinder is a cylinder that generates more torque than the predetermined torque level.

10. The control system of claim 1, wherein:
the engine control module generates a first engine speed signal;
the transmission control module transmits a second engine speed signal to the engine control module; and
the engine control module compares the first engine speed signal with the second engine speed signal to generate a resultant engine speed signal and controls the operation of the engine based on the resultant engine speed signal.

11. A transmission control module comprising:
a transceiver;
at least one of
a back torque module that generates a back torque signal, and
an engine acceleration module that generates an engine acceleration signal, wherein the transceiver transmits at least one of the back torque signal and the engine acceleration signal from the transmission control module to an engine control module;

a hydrodynamic torque module that determines a hydrodynamic torque of a torque converter;

a torque converter module that determines a torque converter clutch torque of the torque converter; and a pump torque module that determine a pump torque of a transmission, wherein the back torque module generates the back torque signal based on the hydrodynamic torque, the torque converter clutch torque, and the pump torque.

* * * * *